US011948193B2

(12) United States Patent
Blount

(10) Patent No.: US 11,948,193 B2
(45) Date of Patent: *Apr. 2, 2024

(54) SYSTEM AND METHOD FOR SECURITIES FINANCE SMART CONTRACTS ON BLOCKCHAINS AND DISTRIBUTED LEDGERS

(71) Applicant: Edmon Blount, Washinton, DC (US)

(72) Inventor: Edmon Blount, Washinton, DC (US)

( * ) Notice: Subject to any disclaimer, the term of this patent is extended or adjusted under 35 U.S.C. 154(b) by 46 days.

This patent is subject to a terminal disclaimer.

(21) Appl. No.: 17/886,542

(22) Filed: Aug. 12, 2022

(65) Prior Publication Data

US 2022/0391980 A1    Dec. 8, 2022

Related U.S. Application Data

(63) Continuation of application No. 16/782,627, filed on Feb. 5, 2020, now Pat. No. 11,416,934.
(Continued)

(51) Int. Cl.
*G06Q 40/04* (2012.01)
*G06F 16/23* (2019.01)
(Continued)

(52) U.S. Cl.
CPC ......... *G06Q 40/04* (2013.01); *G06F 16/2379* (2019.01); *G06Q 10/10* (2013.01);
(Continued)

(58) Field of Classification Search
CPC ........ G06Q 40/04; G06Q 40/03; G06Q 10/10; G06Q 20/3829; G06Q 20/02; G06Q 20/405; G06Q 30/018; G06Q 50/18; G06Q 2220/00; G06F 16/2379; H04L 9/0637; H04L 9/50; H04L 9/3239; H04L 63/12; H04L 2209/56
(Continued)

(56) References Cited

U.S. PATENT DOCUMENTS

2011/0191233 A1*   8/2011   Russo .................... G06Q 40/04
                                                    705/37

FOREIGN PATENT DOCUMENTS

CN    110619565 A   *  12/2019
CN    110659977 A   *   1/2020

OTHER PUBLICATIONS

Ryan et al. "Securities on Blockchain", The Business Lawyer, vol. 73, Winter 2017-2018 published on Jan. 19, 2018, pp. 85-108 (Year: 2018).*

* cited by examiner

*Primary Examiner* — James D Nigh
(74) *Attorney, Agent, or Firm* — Stradley Ronon Stevens & Young LLP; Philip Foret; David Fitzgibbon

(57) ABSTRACT

A blockchain-based system and method for enforcing a smart contract on a network comprising one or more cryptographically-signed blocks. The systems and method permit an original lender or regulatory body to manage risk by tracing a security loan from end-to-end. The system and method also dynamically tracks the value of the loan collateral and if the collateral falls below a predetermined a minimum collateral value threshold within a range of tolerance the system automatically transmits recall and stop trade orders to the relevant parties. In addition, as the chain of transactions grow, the system and method continue to add to an immutable easily verifiable blockchain which facilitates verification and regulatory compliance.

20 Claims, 4 Drawing Sheets

Related U.S. Application Data

(60) Provisional application No. 62/801,273, filed on Feb. 5, 2019.

(51) Int. Cl.
*G06Q 10/10* (2023.01)
*G06Q 20/38* (2012.01)
*G06Q 30/018* (2023.01)
*G06Q 40/03* (2023.01)
*G06Q 50/18* (2012.01)
*H04L 9/06* (2006.01)
*G06Q 20/02* (2012.01)
*G06Q 20/40* (2012.01)
*G06Q 50/26* (2012.01)
*H04L 9/00* (2022.01)
*H04L 9/32* (2006.01)
*H04L 9/40* (2022.01)

(52) U.S. Cl.
CPC ....... *G06Q 20/3829* (2013.01); *G06Q 30/018* (2013.01); *G06Q 40/03* (2023.01); *G06Q 50/18* (2013.01); *H04L 9/0637* (2013.01); *G06Q 50/26* (2013.01); *G06Q 2220/00* (2013.01); *H04L 9/50* (2022.05)

(58) Field of Classification Search
USPC .......................................................... 705/71
See application file for complete search history.

SYSTEM AND METHOD FOR SECURITIES FINANCE SMART CONTRACTS ON BLOCKCHAINS AND DISTRIBUTED LEDGERS

CROSS-REFERENCE TO RELATED APPLICATION

This application claims the priority and benefit of U.S. Utility patent application Ser. No. 16/782,627, filed Feb. 5, 2020, titled "System And Method For Securities Finance Smart Contracts On Blockchains And Distributed Ledgers", which claims priority and benefit of U.S. Provisional Patent Application Ser. No. 62/801,273, filed Feb. 5, 2019, titled "System And Method For Securities Finance Smart Contracts On Blockchains And Distributed Ledgers", the entireties of which are incorporated herein by reference.

TECHNICAL FIELD

This invention relates generally to risk management and regulatory compliance in the securities finance market through the use of smart contracts, blockchains, and distributed ledger technologies.

BACKGROUND

Securities finance is the art of increasing the income on an investment portfolio by lending an equity, bond, or commodity contract to another investor or firm while minimizing the risk of capital loss. In the art as customarily practiced, an agent for an institutional securities lender a) sequences an automated queue to diversify its borrowing counterparties and b) demands collateral, i.e., cash, equities, bonds, derivatives, or a letter of credit, so as to limit the lender's risk of loss from a borrower's failure to return the securities.

Risk management is an evolving practice among sophisticated participants in the securities finance markets. Lenders are pension funds, mutual funds, sovereign wealth funds, corporate treasurers, and other large institutional investors. Borrowers are hedge funds, derivatives dealers, and securities traders. The lending agents and prime brokers are usually subsidiaries of large, heavily regulated bank holding companies that are well-situated to monitor investment risks for institutional lenders.

Lending agents and prime brokers assign experienced risk managers and account administrators to monitor loans, counterparties and collateral. Historically, agents have indemnified client lenders against borrower default and mitigate their own risks by requiring borrowers to post additional collateral above the loan's market value. Similarly, borrowers and their advisors employ computer systems to limit the risk from a lender's failure to return collateral.

With loans involving cross-border or lower-rated counterparties, collateral often must be posted before the borrowed securities are delivered. During the tenure of the loan, the securities are valued daily and agents call for additional collateral if the securities rise in value. This limits lender risk but also increases borrower risk in the opposite direction, when the value of borrowed securities falls below that of the collateral.

Excess collateral beyond a negotiated minimum is returned to the borrower. For all but the largest lenders with separate accounts, the cash collateral is typically held in a multi-lender pool and reinvested in money market instruments. Subject to its own policy and risk constraints, a lender or cash manager seeking higher returns may invest the cash collateral in securities of lesser-quality issuers or those with extended maturities.

All these customary risk mitigants were called into question during the 2008 crisis, when panicky lenders sold securities and recalled their loans, forcing their lending agents to return collateral to borrowers. Agents with cash collateral pools first sold the highest quality and most liquid money market instruments but, as the pooled asset-backs and other derivative instruments plunged in value, the agents imposed gates on additional redemptions related to lender recalls. Over time, many of the impaired instruments were written down by pool managers. In response, attorneys for lenders filed lawsuits seeking reimbursement. The potential losses to banks from litigation, as well as the risk of counterparty defaults, alarmed regulators worldwide.

Congress gave U.S. bank regulators new oversight powers centered on higher capital requirements and greater disclosures. By 2011, bank lending agents began limiting the size and number of lender accounts for which they would offer default indemnification and accept collateral cash balances. By 2017, market regulators finalized new regulations that required, inter alia, parties to a security finance transaction to also file reports ("SFTRs") with newly formed Transaction Repositories. Effective in April 2020, these SFTRs will include unique transaction and activity codes within computer records as well as more than 150 additional data fields describing the counterparties, loans and collateral.

As noted throughout the reform process by outside experts, an unintended consequence of the new regulations has been an increase in systemic market risk, as the securities lending market contracted under weight of the costs and technical challenges of the new regulatory obligations. Fund managers found it more expensive to settle their hedging and short selling activities which, in turn, limited an important price discovery mechanism for the global capital markets. Furthermore, risks for individual participants increased, given that many of the asset manager-lenders who remain are now being denied the previously-offered default indemnifications and other risk management services by their agent banks.

While regulators employ the SFTR disclosures to manage excess market leverage and undue concentrations, one remedy to a pullback by lending agents and prime brokers in their risk management services is more effective use by lenders and borrowers themselves of the oversight data within SFTRs. That is, the securities lenders and borrowers will have to create their own tools to manage their individual risks in securities finance.

The present invention creates tools for individual participants to consolidate the SFTR data so as to act swiftly, especially during periods of heightened market stress, in order to recalibrate tolerances for their own counterparty and collateral risks, thus helping all participants deal with the problems associated with reformed securities finance.

By utilizing public/private blockchain and distributive ledger technology, participants in specific security financing transactions can be joined in a lattice that reveals, for the first time ever, the end-to-end chain of participants in a securities loan. As a result, not only can loans be traced and directed, but recall and stop trade orders can be instantaneously routed to the proper party and exchange. Furthermore, the original lenders can direct their securities to more trusted, lower risk securities borrowers. Indeed, this invention provides systems and methods for asset manager-lenders and their agent banks to manage and mitigate risk within the constraints of negotiated customer contracts and mandated financial regulations.

SUMMARY

This invention is a system or a method to enforce smart contracts on a network comprising one or more cryptographically signed blocks, so as to increase transparency and improve risk mitigation on a securities finance blockchain and/or distributed ledger. By allowing lenders, borrowers, and intermediaries to swiftly recalibrate their risk tolerance limits and report compliance to regulators and stakeholders, this invention will reduce the need for a lending agent's borrower default warranties, in part by: a) reclassifying the qualifications of borrowers; b) limiting the supply of securities available for lending in times of stress; c) improving the liquidity of collateral; and, d) reporting to regulators.

The system includes a software application and a processor. The application operates on a mobile computer device or on a computer device, which is in communication with multiple securities lenders and securities borrowers. The application is configured to receive a securities financing transaction report ("SFTR") from a unique lender and a unique borrower. An SFTR includes a legal entity identifier ("LEI") associated with the unique lender and the unique borrower, a unique international security identification number ("ISIN") associated with a security, as well as counterparty and collateral descriptors associated with the transaction. The application assigns a "Collateral Identification Code" and also receives a minimum collateral value threshold uploaded by an employee or agent of the unique lender. The system includes a processor in communication through the wired and/or wireless communication network with the software application. The processer is configured to: (1) match unique transaction identifiers ("UTI") and related data from lender and borrower SFTR, (2) create a genesis block for a new transaction or an update hash for a subsequent transaction.

The genesis block includes a first timestamp, the unique transaction, and, in some embodiments, may also include a unique proof associated with the unique transaction. An update hash includes the original matched UTI, as well as, inter alia, an updated timestamp, an updated transaction or activity type, an updated lender LEI, updated borrower LEI, an updated CIC and collateral value. The system is further configured to monitor the value of the collateral identified by the last CIC on the blockchain and when the value falls below the minimum collateral value threshold, within a range of tolerance, the processor is configured to issue a margin call or recall order to the initial borrower LEI identified on the blockchain and/or a stop transfer order instructing the relevant clearinghouse on which the relevant security is settled to refuse to transfer the securities to any party other than the original lender.

The system disclosed can generate both new genesis blocks associated with new transactions along with update hashes associated with transactions for which a blockchain has already been constructed.

Regarding genesis blocks the system may incorporate the assigned UTI into the proof.

Although a SFTR is disclosed, the invention is not restricted to SFTRs. Indeed, any financial regulatory report submitted by a lender, borrower, intermediary, or their agents or employees that identifies the unique parties, security and collateral of a transaction could be used by the disclosed system.

The system includes cryptographically-signed blocks. As a result, the processor is further configured to create a unique private transaction key for each transaction, determine the identify of all LEIS associated with prior transactions on the blockchain, and transmit the unique private transaction key to each LEI identified.

The system has the ability to exchange data confidentially and securely with other smart contracts so as to create an "over-the-back-fence" network of market participants. Using the system, a group of like-minded lenders can coordinate counterparty and collateral threshold criteria to change the risk profiles of certain borrowers. Acting cooperatively, lending principals can react more swiftly to changes in the perceived market state, to consider the relevance of factors such as changes in borrower funding costs or collateral concentrations. The system may also use encryption to maintain secure permissioned access to the blockchain and related files, in order to shield the identities of the principals to any entity other than themselves and/or their advisors and agents.

As securities finance is an international market, the software application is configured to accept cross border resolutions from a credentialed foreign regulator and the processor is configured to determine whether the transaction involves cross-border financing and upon confirmation that the transaction involves cross-border financing the processor is configured to override or rescind all recall orders issued after the receipt of any hold resolution from the foreign regulators.

The system may also include additional files, such as an SFTR Journal and/or SFTR Ledger which may reside on a server accessible only to the unique lender and its agents or advisors.

As the system can trace end-to-end for all transactions, the system may identify and monitor all counterparty LEIS associated with a unique the borrower LEI and in the event the system determines that an entity associated with the borrower LEI has defaulted in any single transaction, the system is designed to alert all the counterparty LEIS of the default. In addition, the system may monitor third party news feeds and alert all counterparty LEIS if an entity associated with a borrower LEI declares bankruptcy or legal action is commenced against the entity for non-payment of debts.

In addition, a method for enforcing a smart contract on a blockchain-based network comprising one or more cryptographically-signed blocks is disclosed. The method includes receiving: (1) a cryptographically secure securities financing transaction report ("SFTR"); (2) a minimum collateral value threshold; and (3) a list of blockchains previously associated with previously identified ISINs. The SFTRs include: (1) unique LEIS associated with a unique lender and a unique borrower, (2) an ISIN associated with a security being lent, and (3) descriptors associated with an amount of cash or collateral securities provided. The information on the SFTR defines the transaction. Upon receiving the SFTR is parsed. Such parsing includes comparing the ISIN received with ISINs on previously created blockchains to identify a matching blockchain, and if there is a matching blockchain generating and transmitting to the matching blockchain an update hash containing an updated timestamp, an updated lender LEI, updated borrower LEI, an updated CIC, and an updated minimum collateral value threshold. Conversely, if there is not a matching blockchain, the method generates a genesis block for a new blockchain containing a first timestamp, the unique transaction, and a unique proof associated with the unique transaction.

BRIEF DESCRIPTION OF THE DRAWINGS

Additional aspects, features, and advantages of the invention, both as to its structure, assembly, and use, will be understood and will become more readily apparent when the invention is considered in light of the following description of illustrative embodiments made in conjunction with the accompanying drawings, wherein.

DETAILED DESCRIPTION

Figure 1:
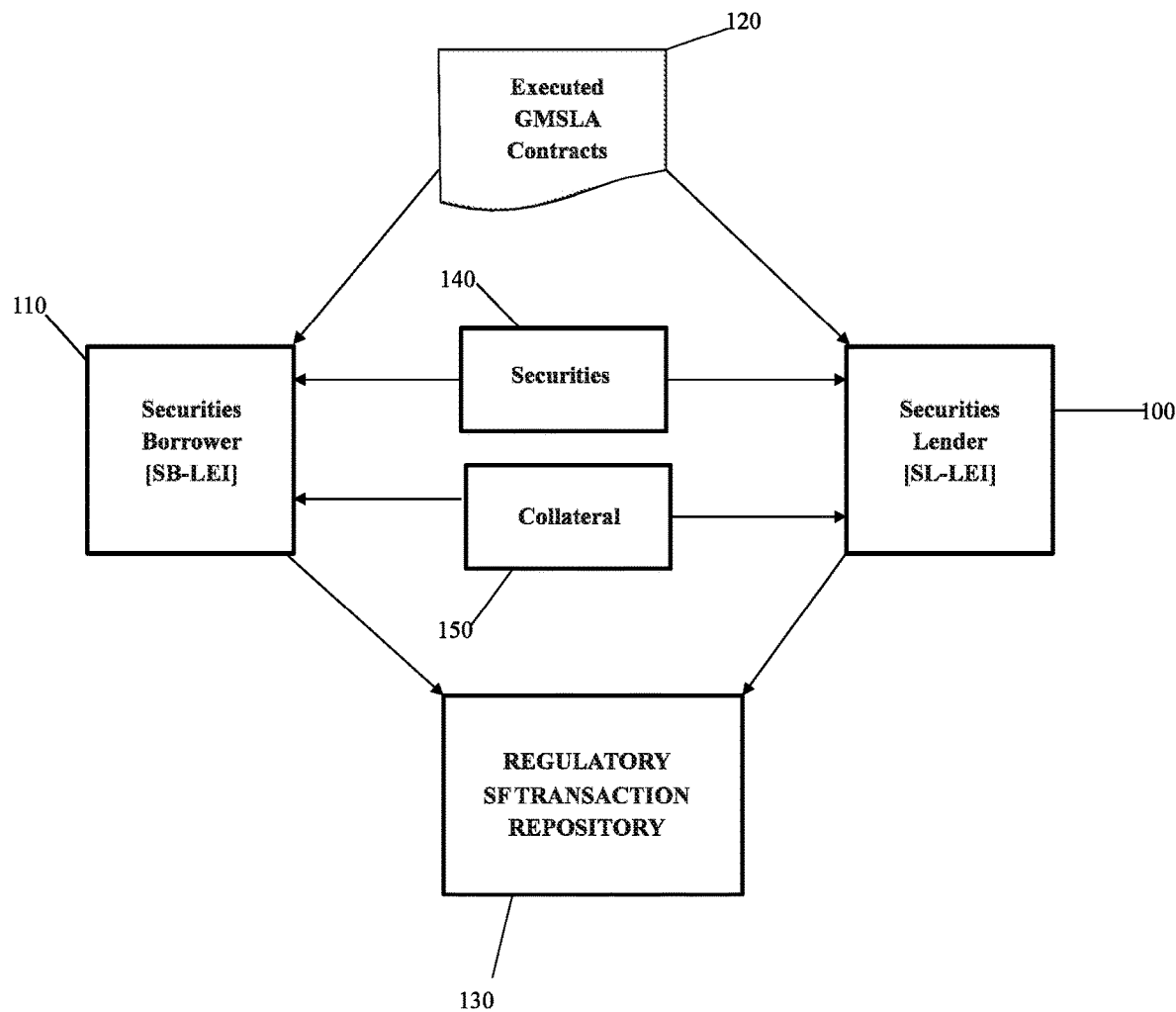
FIG. 1 illustrates a contractual network of securities lenders, lending agents, prime brokers, securities borrowers, and the disclosed system.

Various embodiments of the systems and processes of the invention are described in detail below. Although specific implementations are described, this is done for illustration purposes only. A person skilled in the relevant art will recognize that other components and configurations may be used without parting from the spirit and scope of this disclosure.

A blockchain-based system is disclosed herein defining multiple nodes, with a journal, ledger, and a chain. At its core, blockchain is a distributed system which includes multiple nodes that communicate with each other. A blockchain in the present invention includes a sequenced list of state changes for UTI-matched loans and also operates programs called chaincode (e.g., smart contracts, etc.) which records SFTR transactions in a FTR Journal, maintains timely account data in a SFT Ledger, and executes transactions through the use of smart contracts. Some transactions are operations invoked on the chaincode. In certain embodiments, blockchain transactions typically must be "endorsed" by certain blockchain members and only endorsed transactions may be committed to the blockchain to have an effect on the state of the blockchain. Other transactions which are not endorsed may be disregarded. There may also exist one or more special chaincodes for management functions and parameters, collectively called system chaincodes.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node that can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction that normally includes a genesis block having control and setup information.

The SFTR journal is a sequenced, tamper-resistant record of all state transitions in the loan-state blockchain. State transitions may result from chaincode invocations (i.e., transactions) submitted by participating parties (e.g., client nodes, ordering nodes, endorser nodes, peer nodes, etc.). A transaction results in a set of asset key-value pairs being committed to the journal as one or more operands, such as creates, updates, deletes, and the like. The SFT ledger is a virtual book of participant accounts (which may also include a blockchain) which stores an immutable, classified record of postings. There is typically one SFT ledger showing the current value of ISIN-tracked loan positions for each "channel," which is a credit relationship between a single securities lender and a single borrower. Each peer node maintains a copy of the ledger for each channel in a trust domain of which it is a member. A trust domain is defined by a principal credit relationship as well as the financing intermediaries, typically to include a lending agent and a prime broker.

A chain is a transaction log that is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

The example embodiments are directed to systems, methods, devices, networks, non-transitory computer readable media and/or systems, which support a blockchain solution for managing securities finance transactions. More specifically, the present application provides a blockchain-based system for enforcing a smart contract on a network comprising one or more cryptographically-signed blocks. Some of the benefits of such a solution include streamlined risk management and regulatory compliance reporting. Such an integration allows lenders, borrowers, and intermediaries to manage and report compliance to regulators and stakeholders, as well as to reduce the need for borrower performance warranties, by a) reclassifying the qualifications of borrowers; b) limiting the supply of securities available for lending in times of stress; c) improving the liquidity of collateral; and d) reporting to regulators; and doing so in real time.

Borrower Classification

To classify each party, the system creates and maintains a unique legal entity identifier ("LEI") for each entity. The system may associate subsidiaries with their parent entities, however, each entity will have their own unique LEI.

As outlined above, the system permits the original lender to set minimum collateral threshold for subsequent borrowers and recall the loans if such collateral thresholds are not met within a reasonable degree of tolerance. In certain embodiments, the system uses a lattice design to value the collateral threshold in relation to the LEI of the current borrower. Such a lattice may be based on risk factors and/or preference ratings that were previously uploaded to the software application by an employee or agent of the original lender. For example, an agent of the original lender, such as an agent bank acting as a primary broker, may assign preference ratings or rankings to borrower-LEIs or their collateral based on factors selected from the group consisting of: (1) the original lender's exposure to a borrower as to changes in specific risk due to drift in credit, tenor of management personality (e.g., managerial personality conflicts), changes in capacity to pay, reliability, fees, (2) the original lender's exposure to a securities market as to changes in systemic risk, capital controls, transaction costs, regulatory or legal risk; (3) the original lender and/or current borrower's exposure to the securities market pressure on corporate issuers or their securities as to changes in short interest ratios, regulatory impositions, sector correlations, competitive standing; (4) the relative sequence of the last non-defaulted loan to that borrower, or to the LEI's aggregate business levels with the agent or lender (e.g., response to prior security recall orders); and (5) other factors. Such a preference rank may increase or decrease the collateral value threshold that the borrower-LEI must satisfy.

In another instance, the agent banks may require a higher collateral threshold for harder-to-borrow securities than the collateral threshold of easier-to-borrow securities. Thus, obtaining a scarcity premium for the securities being lent. Furthermore, such loans may be bundled. For example, the collateral threshold for a loan containing two types of securities—one being easier-to-borrow than the second—may be the weighted averaged what the collateral threshold would be set at if the securities were loaned in two individual transactions.

The unique LEIS may also be used to qualify a borrower's creditworthiness. At present, asset manager-lenders only qualify borrowers creditworthiness based on a periodic credit check performed by their agent banks. As a result, it takes time for one lender to learn of a borrower's default to another lender. During this delay, the lender may continue to lend to this less than creditworthy borrower. In response, the processor of the system may be configured to monitor the creditworthiness of the borrower-LEI and upon the identification of an adverse event notify the borrower of an increase in the collateral threshold and to the collateral held falls below the updated collateral threshold, the processor may be configured to transmit recall orders to all LEI's associated with the transaction along with stop transfer orders to the exchange on which the lent security is traded. Such monitoring may occur at set intervals or may be continuous.

Furthermore, the lender may also wish to restrict their securities to only those entities who are using the securities to hedge positions and exclude known short-sellers. As outlined above, currently, lenders only initially know the party to whom they directly lend the securities. Lenders can of course periodically check with the original borrowers to confirm they still hold the securities. However, such follow up takes time. During such a delay, there is the potential for the original borrower to lend the securities to a third party that the original lender does not want to receive the securities. Furthermore, even after the ultimate borrower has been identified, any recall order will take time to work its way through the system.

The disclosed system addresses all these delays by updating the blockchain and notifying all prior parties linked on the blockchain whenever the unique ISIN is transferred to an entity having a new LEI. In updating the blockchain, the processor creates a new hash for the blockchain by consolidating the source loan record on the most recent block of the blockchain with the borrower loan record. The newly-unified record has a separate transaction code but contains the most important data describing the loan which may be selected from the group consisting of: the original UTI, the original ISIN, an updated timestamp, updated borrower and lender LEIS, updated collateral and securities values, denomination of values, and certain other descriptive fields. The processor accomplishes this unification by "querying" the "key" fields in the last block of the blockchain and then "joining" the records before "inserting" them in an updated has that is transmitted to the blockchain. In addition, the processor may also be configured to further update a different set of files/tables stored on a server that is remote from the blockchain. In such an embodiment, the original UTI records may be posted to a journal and the new value-related events may be posted to a separate ledger. Regardless, the updated blockchain remains a cryptographically secured relational database.

"Cryptographically secure" means the transactions on the public blockchain are made private by encrypting the contents of the transaction with private keys. As a result, only users or entities that have the key to the transaction can view the transaction. For example, the system may permit lenders to sign and encrypt their information in the ledger and blockchain then transmit the relevant key to the borrower for authentication. Furthermore, on subsequent transitions, the system may transmit the relevant private key to all prior parties. In this regard, subsequent parties can still hash on the contents of the transaction but not view it in its entirety. Only the original lender, borrower, and regulators, who may receive the keys from the original lender or original borrower can view the transaction in its entirety.

The unique LEIS also permit asset manager-lenders to direct their agent banks to re-qualify borrowers based on evolving circumstances and, in addition, to modify the lender's exposure to market systems based on changing conditions. As a result, this invention permits greater clarity and risk control for those lenders and intermediaries with the inclination and ability to access and to understand the block-chained shared ledger.

Supply Management

Embodiments of the systems and methods of the invention disclosed herein permit a supply restriction or securities recall notice to be executed or, alternatively, to be repealed, in whole or in part, by sharing information and instructing all intermediaries simultaneously. Specifically, the processor is configured to notify all parties of such orders. A dealer-borrower can use the smart contract to appeal the notice based on current market intelligence. An agent bank can also use the smart contract to substitute a lender's recalled position with a security borrowed from another lender. In this way, the dealer or agent bank can avoid recalling the position from the ultimate borrower and, consequentially, terminating the trade enabled by the original securities loan.

Asset manager-lenders using this innovation may also restrict the substitution process in order to limit excessive short-selling of certain securities in stressed markets. For example, asset managers who wish to lend while still protecting the value of their holdings can include factors that increase the collateral threshold and/or fees associated with the transaction if the securities are borrowed by a LEI associated with directional short sellers. As a result, the securities may be directed to more desirable, liquidity-enhancing LEIS associated with borrowers who are using market-neutral trading strategies. As a result, this innovation not only can help asset manager-lenders reduce risk but can also reduce selling pressure in a rapidly declining market that can minimize the need for security or market "circuit breakers" to be triggered. This invention allows asset managers to supplement or even pre-empt those regulatory impositions to their own benefit and that of their investor clients.

In addition to individual asset managers, if a plurality of asset manager-lenders on a blockchain or distributed ledger determine that the value of securities on loan to any individual borrower or group of borrowers exceeds the collateral threshold, the processor is configured to forward recall orders with cancellation of any rights of substitution to the relevant borrower-LEIs thereby restricting the availability of lendable securities. This will help regulators to prevent excessive short-selling during periods of unusual stress. The recall orders will also lower the lender's exposure to borrower default. Therefore, this invention permits more precise and dynamic restrictions by curtailing the loan supplies available to short-sellers, reducing the need to enact regulatory market interruptions.

Collateral Management

The systems and methods of the invention can direct the lender or sub-lender (e.g., an initial borrower who further lends the borrowed security) or other entity to immediately invest, subject to qualifications, cash collateral in repurchase agreements or other high-quality, liquid assets so as to move the non-operating cash off the bank's balance sheet and reduce the capital charges. For example, the processor may be configured to confirm that collateral has been transferred and upon confirmation of the transfer send out orders for cash collateral to be invested in highly liquid money-market products. Furthermore, the processor may be configured to confirm the investment of the cash collateral and notify the borrower of where and/or how the collateral is invested.

If such loans are recalled, the systems and method are further configured, with the approval of the lender, to override the recall notice by imposing a liquidity fee or a preventive gate on the return of the cash collateral. If loans are terminated through default by borrowers or agent banks, the collateral may be bought-in and sold by the securities custodian, subject to qualified regulatory restrictions, such as resolution stays discussed below. For example, in the case of other arrangements, the systems and methods of the invention direct the lending agent to adjust the borrowing fee or rebate on reinvested cash collateral as compensation to the securities owner for the right to direct the vote.

Regulatory Compliance

U.S. regulators impose a wide range of requirements on participants in the securities finance markets. For instance, Regulation T of the Federal Reserve Board of Governors requires that securities loans must satisfy a specific "permitted purpose" before credit can be extended to a borrower. In addition, and as described above, the Securities & Exchange Commission directs regulated broker-dealers and securities exchanges to follow procedures which prevent or limit trading when certain stressful conditions exist. This invention automatically monitors loan activity and flags or prevents suspected violations of regulations.

Furthermore, in cases of cross-border insolvencies, regulators may impose resolution stays that take precedence over private contract provisions to buy-in, transfer, or otherwise liquidate collateral. The systems and methods of the invention may be configured to insert a resolution code to the blockchain and transmits an order to the exchange on which the borrowed security is traded that prevents liquidation of the collateral pending approval by credentialed regulatory authorities.

Global supervisors, such as the Financial Stability Board and the Bank for International Settlements, assist U.S. market regulators by coordinating the reporting specifications of the Securities Financing Transaction Repository for their member jurisdictions. The systems and methods of the invention create entries and factors which assist participants in complying with their reporting obligations.

A discussion of the systems and methods surrounding the invention of managing risk is provided below. First, an outline of the system and method is disclosed. Second, the components of the system are discussed. Third, a description of a cloud computing system, the preferred environment of the system, is then disclosed. Fourth, an exemplary embodiment of how the system would work is outlined.

SYSTEM OVERVIEW

The disclosed system and method centers around a contractual network of securities lenders, lending agents, prime brokers, securities borrowers. Prior to the introduction of the system or method a securities financing transaction report (SFTR) report is prepared. With the SFTR, the unique uniform transaction identifier (UTI) may be associated with the international securities identifier number (ISIN) to create a genesis block of a blockchain having the transaction details along with a related proof. In certain embodiments, the unique UTI may be a component of the proof. Furthermore, the system and method track subsequent transactions involving the ISIN to create and send update hashes to the blockchain thereby creating an auditable transaction chain identifying the specific LEI holding the unique ISIN at all times. Furthermore, the blockchain will incorporate at least a minimum collateral value threshold previously uploaded by an employee or agent (e.g., the SL-ADV or the PB-LEI) of the unique lender (i.e., the SL-LEI). Such a minimum collateral value threshold will allow for the efficient mitigation of counter party risk. Not only will the system be capable of identifying the final borrowers, but it will also be capable of identifying all intermediate borrowers so if a recall order is required such an order can be transmitted to all relevant parties at once. Finally, the system and method are also capable of dynamically changing the administering of the based on external factors such as increasing the collateral requirement if the original borrower begins to.

Creation of the SFTR

FIG. 1 depicts how an SFTR may be generated. Specifically, a securities lender (SL-LEI) 100 and a securities borrower (SB-LEI) 110 execute standard Global Master Securities Lending Agreements (GMSLA) 120 with an attached rider detailing the nature of their transaction preferences. Upon execution the securities 140 and collateral 150 are exchanged. Each executed loan transaction 120 and collateral transfer 150 is then reported via an SFTR to designated market regulators 130, with Unique Transaction Identifiers (UTI) and Legal Entity Identifiers (LEI) in the header of each record. As identified in FIG. 1, the SL-LEI 100, the SB-LEI 110, both prepare and transmit the SFTR to global regulators 130.

Indeed, in developed markets, several regulatory securities financing transaction repositories have been created to receive SFTRs, which must be submitted daily. In the SFTRs, the LEIS are associated with the entities governed by the contractual counter parties, as identified in regulatory reports that monitor the actions and influence of governed entities.

In a typical Preferred Securities Financing (PSF) transaction, the SB-LEI is a customer of a prime broker (PB-LEI) who wants to short a specific stock. A request to borrow a certain number of the identified shares is relayed from PB-LEI to a lending agent (LA-LEI) for SL-LEI, who queries the custodian for SL-LEI, who is a confirmed PSF participant. If SL-LEI'S custodian holds the securities and SL-LEI has marked the identified shares as available for lending to trusted borrowers (e.g., SB-LEI), then: the loan transaction is executed at a matching facility and the securities are delivered to PB-LEI through a securities depository. Nearly simultaneously with delivery of the securities, the short position is covered after the loan collateral is received and processed through the normal systems and procedures. Upon consummation of the loan, a SFTR is prepared by both PB-LEI and LA-LEI as agents for SB-LEI and SL-LEI with both reports sent to a pre-matching facility, then relayed to the Securities Financing Transaction Repository.

The SFTR records are also typically stored within both intermediaries' cloud accounts. As a result, a securities lending advisor (SL-ADV) for either the SL-LEI or the SB-LEI may query either cloud (with permission) and obtain its own copy of the SFTR records. The SL-ADV may then produces a periodic report for both the principals and intermediaries of the transaction.

Of course, the loan can be updated in a number of ways. For example, the fee can be revised to show that the ISIN has either moved to an easier- or harder-to-borrow status. Similarly, analysis of the blockchain can show that a particular LEI has become hard-to-finance, for a variety of reasons. In another instance, at the time of the request, PB-LEI may add an entry to a new "Preference" field in the SFTR record identifying the loan as a directed trade with a preferred SL-LEI and custodian/source.

Creation and Update of the Transaction's Blockchain

As outlined above, the securities financing industry has created agents and other intermediaries to facilitate high-capacity loan transaction volumes for principal lenders and borrowers. For example, LA-LEIS locate borrowers and deliver securities loans on behalf of their principals (i.e., the SL-LEIS), while PB-LEIS receive and return securities for the SB-LEI, some of which are their own trading desks. Today, neither SL-LEI nor their LA-LEI know whether PB-LEIS are receiving securities as loans to their own trading accounts or to a subsequent, final borrower.

This innovation will enable SL-LEIS, LA-LEIS, and SL-ADVs to not only identify the final borrowers, but also to help direct certain loans to the SL-LEI'S most trusted borrowers. As a benefit of the resulting transparency, SL-LEI'S may accept a reduced level of borrower default indemnifications from their LA-LEIS, who will in turn increase profits by lowering costs as a result of reduced minimum levels of capital reserves from their regulators.

Figure 2:
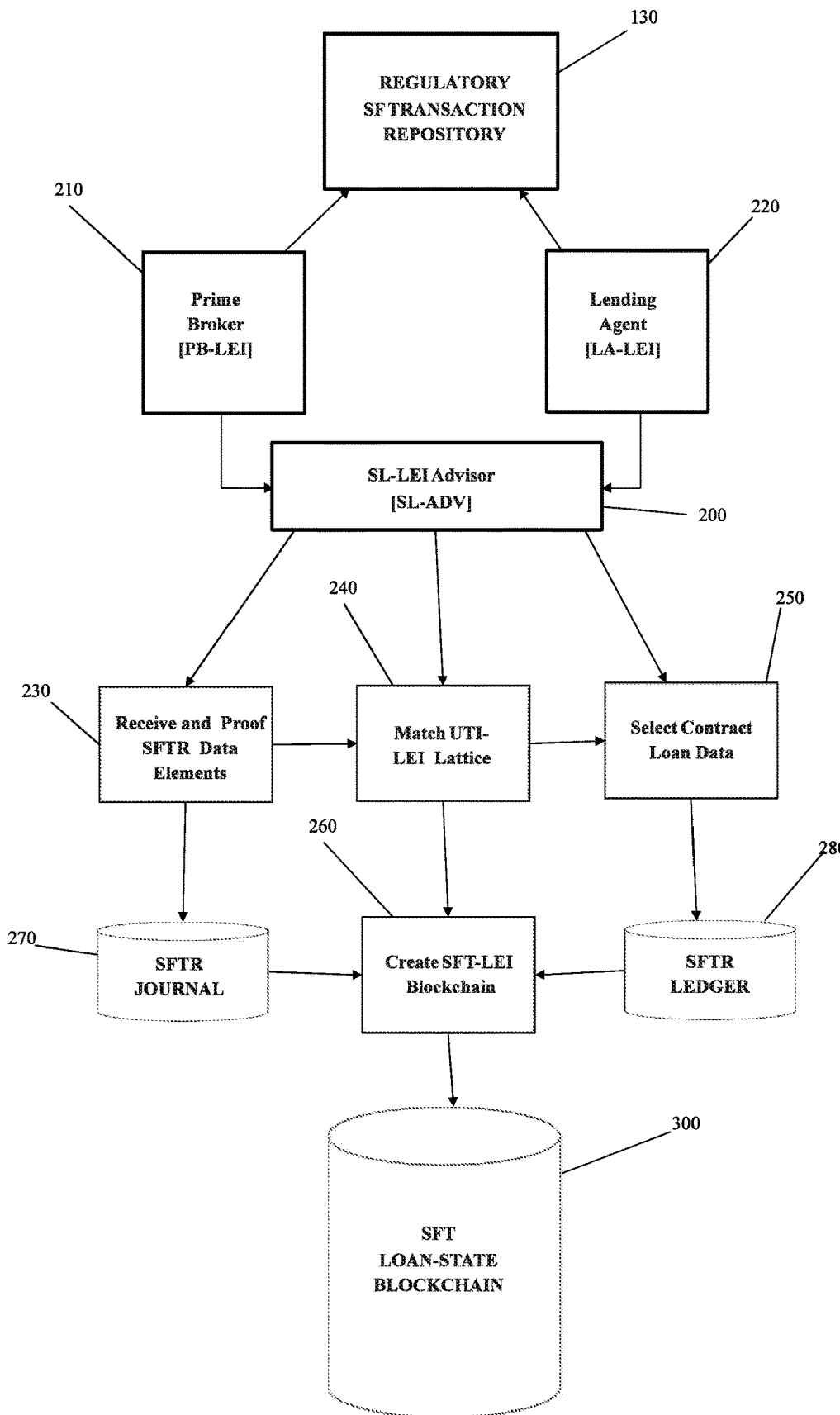
FIG. 2 illustrates one embodiment of the creation of the shared and distributed ledger of the disclosed invention.

FIG. 2 depicts how the system generates an immutable cryptographically secure blockchain. The process begins by obtaining the SFTR 200. In FIG. 2, the SFTR is depicted as being obtained by the SL-ADV from either the PB-LEI 210 or the LA-LEI 220. However, the system is not restricted to receiving the SFTR from a specific party. For example, the system can receive the SFTR from the SL-LEI, the SB-LEI, or any other party or database.

Upon receiving the SFTR, the system validates the SFTRs 230, by selecting those records provided by LA-LEI's and PB-LEI'S which identify the LEIS of PFS-participating SL-LEI'S and SB-LEI'S, i.e., those entities with valid GMSLA's on file. The captured records are posted to an encrypted SFTR journal 270 and made accessible to participating entities for comparison purposes.

At the same time, or soon afterwards, the system uses a proprietary algorithm 240 to match ISIN's for a certain tolerant date from a) PB-LEI'S to SB-LEI'S and b) LA-LEI's to PB-LEI's, then filters and selects varying-probability UTI's to create a ranked-lattice array of directed securities loan records, which are forwarded to the blockchain creation process. In certain embodiments, the system receives encrypted SFTRs and must decode the encrypted SFTRs to select data elements using private keys provided by the party transmitting the SFTRs. In sequence, the processor of the system isolates the decrypted key fields in each SFTR record so as to identify the SL-LEI lender source of securities being loaned, in addition to isolating descriptive fields such as the ISIN, timestamp, transaction type, LEIS, Loan Value, and Fee. The decrypted records are posted to a temporary file. The processor then searches in succession the new SFTR records to identify the SB-LEI borrower beneficiary of securities being loaned, using field constraints such as ISIN, timestamp, Loan Value, and contract ID. Using a heuristic weighting system, the processor selects the most likely linkages among UTIs and then composes and forwards new PSF consolidated loan records and unlikely SF loan records to the blockchain, where they are unified with a new UTI as well as a reference to the originally UTIs.

For each SFTR, the system selects loan data 250 from the lattice array which is then entered in an SFTR ledger. In some instances, loan details may be compared with other data sources, such as those created as part of the Agent Lender Disclosure program. The contract loan data is posted to an encrypted SFTR ledger 280 and made accessible to participating entities for comparison purposes.

Preferred ISIN loan contract data is drawn from the encrypted SFTR journal 270 and SFTR ledger 280 and the processor determines if a blockchain associated with the ISIN exists. If the processor determines that a blockchain associated with the ISIN exists, then the processor creates a cryptographically secured block hash to update the values in the cryptographically secured blockchain with the new information. Conversely, if the processor determines that there is no blockchain associated with the unique ISIN, the processor creates a cryptographically secured genesis block containing the loan data from the SFTR and a proof. The system then posts the cryptographically secured blockchain for access by participating entities. Each block in the chain assigns a value to the most recent action of an LEI. Such actions normally influence the predetermined collateral value threshold. Some factors affect the numeric value of the threshold (e.g., an increase or decrease), others affect to whom the ISINs may be transferred in the future, and still others reduce or increase the duration of the loan. The nature of the value is determined by the factors specified in the smart lending contract, e.g., different codes will assign a financial, sequential, consequential or other value to the loan. The degree of the loan-state value is set by the peer-relative value of a pre-defined, loan-state matrix. The loan-state of each ISIN transaction is defined by the cumulative and residual impact of all blocks in the SFT-LEI chain.

Administration of Counterparty Risk

The system and method also evaluate the ISIN and overall lending trends to respond with revisions to the degree to which SL-LEI'S define limits to their risk tolerances for certain specific SB-LEI'S. By monitoring loan trends in the SFTR Journal in conjunction with external intelligence and SL-LEI policies, this innovation restricts, restores or replaces the existing SB-LEI rating in the counterparty profile preferences. For example, if a particular SB-LEI is shown to be accumulating borrowed ISIN positions for which the securities market price is rising quickly, SL-LEIS can restrict that LEI's ability to borrow additional ISIN positions.

Figure 3:
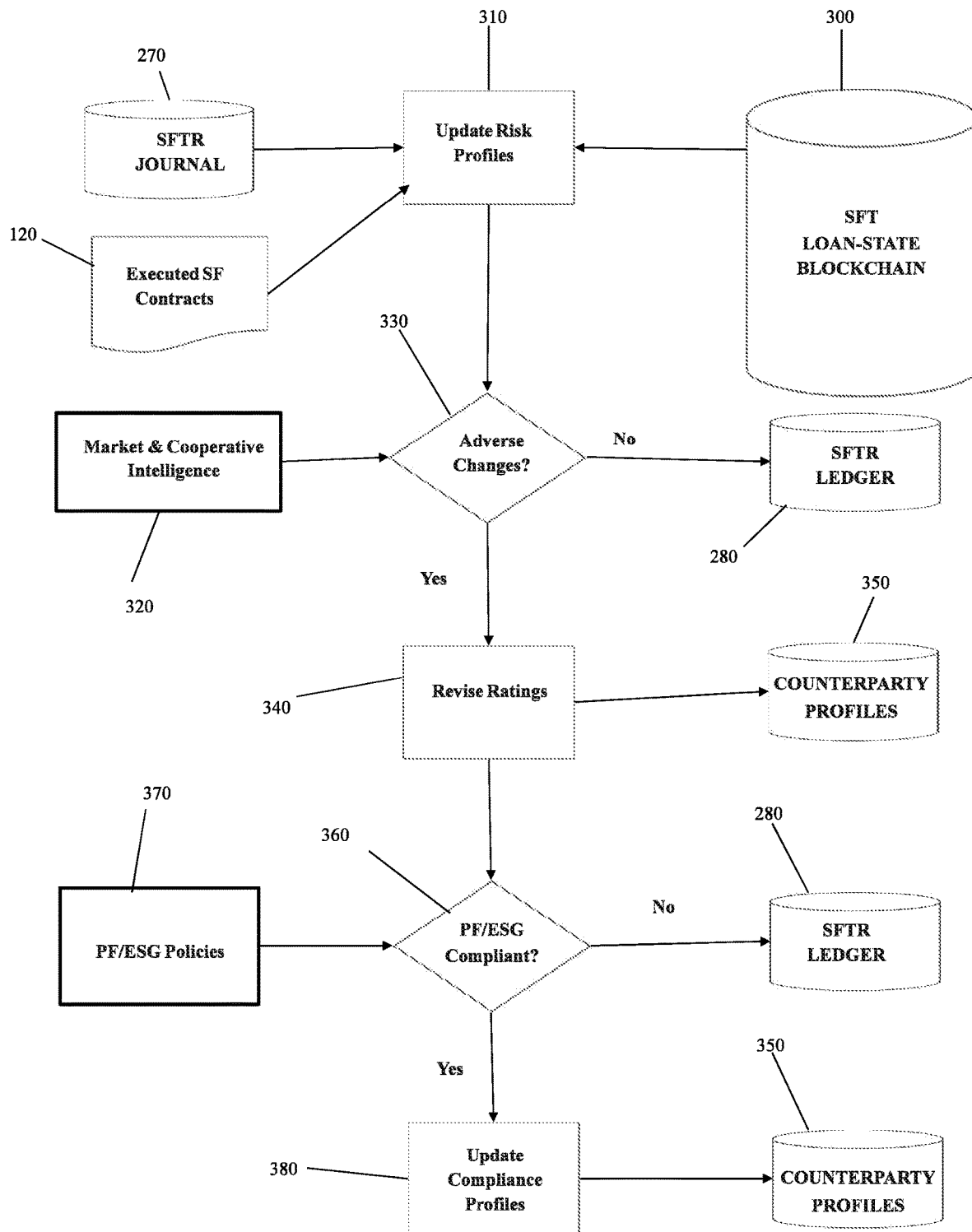
FIG. 3 illustrates one embodiment of the manner by which the system monitors counterparty risk.
Figure 4:
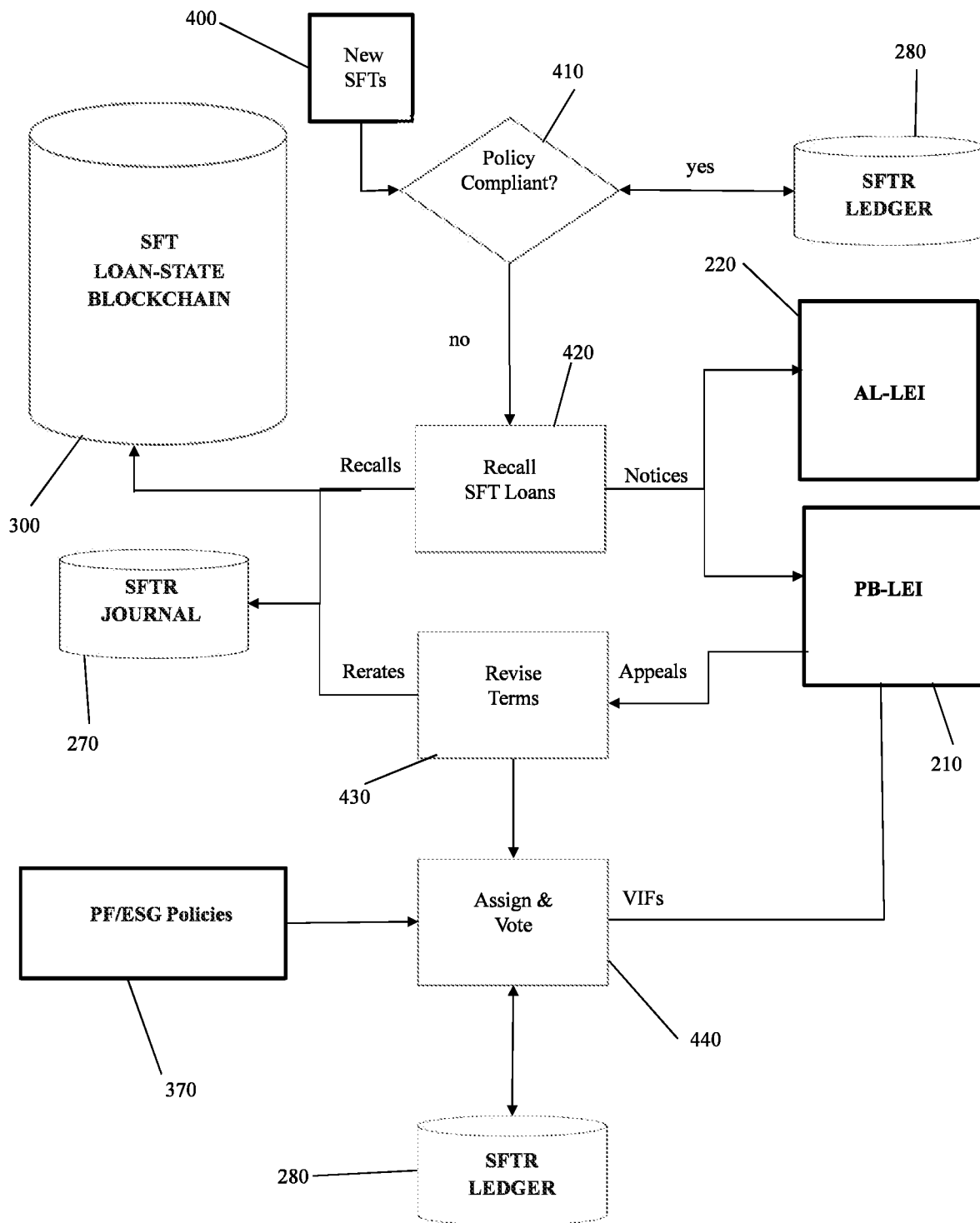
FIG. 4 illustrates one embodiment of the manner by which the system may recall loans or assign Vote Instruction Forms.

In one embodiment, depicted in FIG. 3, the system or method reviews for compliance all subsequent SFTRs 310 to determine: whether the subsequent SFTRs are associated with any previous SFTRs (e.g., via their unique ISINs or UTIs). Such prior SFTRs may be available in either the SFTR Journal 270, SFTR Ledger 280, or within associated blockchains 300. In the event the system identifies a non-compliance event, such as a default under a contract, the system flags the non-compliant LEI and alerts all LEIS who are counterparties to the non-compliant LEI of the non-compliance event.

The system further monitors third party market intelligence and news feed platforms 320 to determine if parties associated with LEIS are suffering adverse impacts. When an adverse event associated with a LEI is identified, such as regulatory censure, bankruptcy or the commencement of litigation for unpaid contracts, the system is configured to flag 330 the associated LEI and alerts all participating LEIS who are counterparties to the flagged LEI of the adverse event. The system updates the SFTR Ledger 280 to associate the adverse event flag with the relevant LEI. The system also updates 340 a counterparty profile ledger 350 to identify the non-compliant event.

Adverse changes to the risk tolerance limits for counterparties are posted by the system to the Counterparty Profiles file and then queued for compliance review 360. In the compliance review 360, the system receives lending and investment policies 370 previously uploaded by the SL-LEI or their agents and employees and the processor determines if the SB-LEI is still in compliance with the policies. If the SB-LEI is determined to still be in compliance with SL-LEI's policies, the system updates 380 the counterparty profile 350 with the information but takes no other action. Conversely, where the SB-LEI is deemed to be out of compliance with the updated minimum collateral value threshold, within a range of tolerance, the system is configured to send out recall orders or stop trade orders.

Furthermore, non-compliant loan records are posted to the SFTR Ledger 280 with a special code for reporting purposes, while compliant loan records are queued to update the counterparty profiles ledger 350. If a SL-LEI accumulates a specified number of non-compliant loans that exceed pre-set limits the system may restrict additional lending by the SL-LEI.

Administration of Collateral

Upon receipt of an ISIN corporate action 400 (e.g., notice of shareholder meeting), the system evaluates 410 cumulative SFT loans within each ISIN position for policy compliance, relative to a) the criteria stated in the lending policies 370 previously uploaded by the SL-LEI or their agents and employees and also b) the counterparty profiles 350. The system updates the SFTR Ledger 280, determines the LEI holding the securities, issues a recall order 420 to all borrower linked LEI's and their agents for the relevant ISIN (e.g., the LA-LEI and the PB-LEI), and codes a recall notice into the blockchain 300 and then posts the recall to the SFTR Journal 270.

The borrower has the ability to appeal the recall order. If the appeal is granted 430 the recall order 420 is rescinded. Conversely, if the appeal is denied 440, the securities are recalled. Appeals are granted or denied according to the terms of the specific participating entities' executed contracts, even if the terms are variant from the cooperative group's policies. Recall recessions are posted to the blockchain 300. If fee changes are amended as part of the recall order recision, then a rerate is posted to the blockchain 300 and the SFTR Journal 270. If In the event that a recall is rescinded based on a proxy agreement, Proxy Voter Instruction Forms (VIFs) are sent from the borrower's service provider (e.g., PB-LEI's) with the granted appeal and notice of recision of the recall order.

SYSTEM COMPONENTS

The system includes a general-purpose computing device, including a processing unit (CPU or processor), and a system bus that couples various system components including the system memory such as read only memory (ROM) and random-access memory (RAM) to the processor. The system can include a storage device connected to the processor by the system bus. The system can include interfaces connected to the processor by the system bus. The system can include a cache of high speed memory connected directly with, in close proximity to, or integrated as pmi of the processor. The system can copy data from the memory and/or a storage device to the cache for quick access by the processor. In this way, the cache provides a performance boost that avoids processor delays while waiting for data. These and other modules stored in the memory, storage device or cache can control or be configured to control the processor to perform various actions. Other system memory may be available for use as well. The memory can include multiple different types of memory with different performance characteristics.

Computer Processor

It can be appreciated that the invention may operate on a computing device with more than one processor or on a group or cluster of computing devices networked together to provide greater processing capability. The processor can include any general-purpose processor and a hardware module or software module, stored in an external or internal storage device, configured to control the processor as well as a special-purpose processor where software instructions are incorporated into the actual processor design. The processor may essentially be a completely self-contained computing system, containing multiple cores or processors, a bus, memory controller, cache, etc. A multi-core processor may be symmetric or asymmetric.

For clarity of explanation, an illustrative system embodiment is presented as including individual functional blocks including functional blocks labeled as a "processor". The functions such blocks represent may be provided through the use of either shared or dedicated hardware, including, but not limited to, hardware capable of executing software and hardware, such as a processor, that is purpose-built to operate as an equivalent to software executing on a general-purpose processor. For example, the functions of one or more processors may be provided by a single shared processor or multiple processors and use of the term "processor" should not be construed to refer exclusively to hardware capable of executing software. Illustrative embodiments may include microprocessor and/or digital signal processor (DSP) hardware, read-only memory (ROM) for storing software performing the operations discussed below, and random-access memory (RAM) for storing results. Very large-scale integration (VLSI) hardware embodiments, as well as custom VLSI circuitry in combination with a general-purpose DSP circuit, may also be provided.

System Bus

The system bus may be any of several types of bus structures including a memory bus or memory controller, a peripheral bus, and a local bus using any of a variety of bus architectures. A basic input/output (BIOS) stored in ROM or the like, may provide the basic routine that helps to transfer information between elements within the computing device, such as during start-up.

Storage Device

The computing device can further include a storage device such as a hard disk drive, a magnetic disk drive, an optical disk drive, a solid-state drive, a tape drive or the like. Similar to the system memory, a storage device may be used to store data files, such as location information, menus, software, wired and wireless connection information (e.g., information that may enable the mobile device to establish a wired or wireless connection, such as a USB, Bluetooth or wireless network connection), and any other suitable data. Specifically, the storage device and/or the system memory may store code and/or data for carrying out the disclosed techniques among other data.

In one aspect, a hardware module that performs a particular function includes the software component stored in a non-transitory computer-readable medium in connection with the necessary hardware components, such as the processor, bus, display, and so forth, to carry out the function. The basic components are known to those of skill in the art and appropriate variations are contemplated depending on the type of device, such as whether the device is a small, handheld computing device, a desktop computer, or a computer server.

Although the preferred embodiment described herein employs cloud computing and cloud storage, it should be appreciated by those skilled in the art that other types of computer readable media which can store data that are accessible by a computer, such as magnetic cassettes, flash memory cards, digital versatile disks, cartridges, random access memories (RAMS), read only memory (ROM), a cable or wireless signal containing a bit stream and the like, may also be used in the operating environment. Furthermore, non-transitory computer-readable storage media as used herein include all computer-readable media, with the sole exception being a transitory propagating signal per se.

Interface

To enable user interaction with the computing device, an input device represents any number of input mechanisms, such as a microphone for speech, a touch-sensitive screen for gesture or graphical input, keyboard, mouse, motion input, speech and so forth. An output device can also be one or more of a number of output mechanisms known to those of skill in the art such as a display screen, speaker, alarm, and so forth. In some instances, multimodal systems enable a user to provide multiple types of input to communicate with the computing device. The communications interface generally governs and manages the user input and system output. Furthermore, one interface, such as a touch screen, may act as an input, output and/or communication interface.

There is no restriction on operating on any particular hardware arrangement and therefore the basic features here may easily be substituted for improved hardware or firmware arrangements as they are developed.

Software Operations

The logical operations of the various embodiments disclosed are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system can practice all or part of the recited methods, can be a part of the recited systems, and/or can operate according to instructions in the recited non-transitory computer-readable storage media. Such logical operations can be implemented as modules configured to control the processor to perform particular functions according to the programming of the module. For example, if a storage device contains modules configured to control the processor. These modules may be loaded into RAM or memory at runtime or may be stored as would be known in the art in other computer-readable memory locations. Having disclosed some components of a computing system, the disclosure now turns to a description of cloud computing, which is the preferred environment of the invention.

CLOUD SYSTEM

Cloud computing is a type of internet-based computing in which a variety of resources are hosted and/or controlled by an entity and made available by the entity to authorized users via the Internet. A cloud computing system can be configured, wherein a variety of electronic devices can communicate via a network for purposes of exchanging content and other data. The system can be configured for use on a wide variety of network configurations that facilitate the intercommunication of electronic devices. For example, each of the components of a cloud computing system can be implemented in a localized or distributed fashion in a network.

Cloud Resources

The cloud computing system can be configured to include cloud computing resources (i.e., "the cloud"). The cloud resources can include a variety of hardware and/or software resources, such as cloud servers, cloud databases, cloud storage, cloud networks, cloud applications, cloud platforms, and/or any other cloud-based resources. In some cases, the cloud resources are distributed. For example, cloud storage can include multiple storage devices. In some cases, cloud resources can be distributed across multiple cloud computing systems and/or individual network enabled computing devices. For example, cloud computing resources can communicate with a server, a database, and/or any other network enabled computing device to provide the cloud resources.

In some cases, the cloud resources can be redundant. For example, if cloud computing resources are configured to provide data backup services, multiple copies of the data can be stored such that the data is still available to the user even if a storage resource is offline, busy, or otherwise unavailable to process a request. In another example, if a cloud computing resource is configured to provide software, the software can be available from different cloud servers so that the software can be served from any of the different cloud servers. Algorithms can be applied such that the closest server or the server with the lowest current load is selected to process a given request.

User Terminals

A user interacts with cloud computing resources through user terminals connected to a network by direct and/or indirect communication. Cloud computing resources can support connections from a variety of different electronic devices, such as servers; desktop computers; mobile computers; handheld communications devices (e.g., mobile phones, smart phones, tablets); set top boxes; network-enabled hard drives; and/or any other network-enabled computing devices. Furthermore, cloud computing resources can concurrently accept connections from and interact with multiple electronic devices. Interaction with the multiple electronic devices can be prioritized or occur simultaneously.

Cloud computing resources can provide cloud resources through a variety of deployment models, such as public, private, community, hybrid, and/or any other cloud deployment model. In some cases, cloud computing resources can support multiple deployment models. For example, cloud computing resources can provide one set of resources through a public deployment model and another set of resources through a private deployment model.

In some configurations, a user terminal can access cloud computing resources from any location where an Internet connection is available. However, in other cases, cloud computing resources can be configured to restrict access to certain resources such that a resource can only be accessed from certain locations. For example, if a cloud computing resource is configured to provide a resource using a private deployment model, then a cloud computing resource can restrict access to the resource, such as by requiring that a user terminal access the resource from behind a firewall.

Service Models

Cloud computing resources can provide cloud resources to user terminals through a variety of service models, such as Software as a Service (SaaS), Platforms as a service (PaaS), Infrastructure as a Service (IaaS), and/or any other cloud service models. In some cases, cloud computing resources can provide multiple service models to a user terminal. For example, cloud computing resources can provide both SaaS and IaaS to a user terminal. In some cases, cloud computing resources can provide different service models to different user terminals. For example, cloud computing resources can provide SaaS to one user terminal and PaaS to another user terminal.

User Interaction

In some cases, cloud computing resources can maintain an account database. The account database can store profile information for registered users. The profile information can include resource access rights, such as software the user is permitted to use, maximum storage space, etc. The profile information can also include usage information, such as computing resources consumed, data storage location, security settings, personal configuration settings, etc. In some cases, the account database can reside on a database or server remote to cloud computing resources such as servers or database.

Cloud computing resources can provide a variety of functionality that requires user interaction. Accordingly, a user interface (UI) can be provided for communicating with cloud computing resources and/or performing tasks associated with the cloud resources. The UI can be accessed via an end user terminal in communication with cloud computing resources. The UI can be configured to operate in a variety of client modes, including a fat client mode, a thin client mode, or a hybrid client mode, depending on the storage and processing capabilities of cloud computing resources and/or the user terminal. Therefore, a UI can be implemented as a standalone application operating at the user terminal in some embodiments. In other embodiments, a web browser-based portal can be used to provide the UI. Any other configuration to access cloud computing resources can also be used in the various embodiments.

The 2007-2008 financial crisis might have been avoided if market participants had access to a this invention, given that they would have had a consolidated view of the increasing costs of funding that certain stressed SB-LEIS and PB-LEIS were experiencing in the months preceding the failures of Bear Stearns and Lehman Brothers. With greater knowledge of the rising financial stresses than was available to any individual SL-LEI or LA-LEI, participating lenders and borrowers could have taken action to reduce their exposure to the stressed borrowers before the situation became common knowledge to the broader market community.

While this subject matter has been disclosed with reference to specific embodiments, it is apparent that other embodiments and variations can be devised by others skilled in the art without departing from the true spirit and scope of the subject matter described herein.

What is claimed is:

1. A blockchain-based system for enforcing a smart contract on a network comprising one or more cryptographically-signed blocks, the system comprising:
 a software application, the application operating on a mobile computer device or on a computer device, in communication with securities lenders and securities borrowers, the application is configured to receive:
  a securities financing report from a unique lender or a unique borrower, wherein the report includes:
   a lender identifier associated with the unique lender,
   a borrower identifier associated with the unique borrower,
   a unique security identification number associated with a security, traded on an exchange, being lent by the unique lender to the unique borrower, and
   a collateral identifier associated with an amount of cash or quality of collateral securities provided by the unique borrower to the unique lender,
   wherein the lender identifier, the borrower identifier, the security identification number and the collateral identifier define a unique transaction, and
  a minimum collateral value threshold previously uploaded by an employee or agent of the unique lender, and
  a list of blockchains previously associated with previously identified security identification numbers;
 a processor in communication through the wired and/or wireless communication network with the software application, the processor is configured to:
  assign a supplemental unique transaction identifier ("UTI") to the unique transaction,
  compare the security identification number received by the software application with the prior blockchains to identify a potential matching transaction, and
  in the event no matching blockchain is identified, create a genesis block for a new blockchain, the genesis block containing a first timestamp, the unique transaction, and a unique proof associated with the unique transaction,
 wherein, the software application is further configured to receive additional securities financing reports and upon the receipt of an additional securities financing report by the software application, the processor is further configured to query the list of blockchains to determine if the unique security identification number in the additional securities financing report is associated with the security identification number on a prior blockchain and when the processor determines that the unique security identification number in the additional securities financing report is associated with a prior blockchain the processor is configured to generate and transmit to the prior blockchain an update hash containing an updated timestamp, an updated lender identifier, and updated borrower identifier and an updated collateral identifier;

wherein, the processor is further configured to monitor the value of the collateral identified by the last collateral identifier on either the new blockchain or the prior blockchain and when the value falls below the minimum collateral value threshold, within a range of tolerance, the processor is configured to issue orders:
  recalling the securities associated with the security identification number to all borrower identifiers identified on the blockchain and
  instructing the exchange to prohibit any transfers of the securities to parties other than the first lender identifier identified on the new blockchain or the prior blockchain.

2. The system of claim 1 wherein the proof includes the UTI.

3. The system of claim 1 wherein the process is further configured to create a unique private transaction key for each transaction, determine the identity of all identifiers associated with prior transactions on the blockchain and transmit the unique private transaction key to each identifier identified.

4. The system of claim 3, wherein the private transaction key uses at least 256-bit encryption or higher.

5. The systems of claim 1, wherein the software application is configured to accept cross border resolutions from a credentialed foreign regulator and the processor is configured to determine whether the transaction involves cross-border financing and upon confirmation that the transaction involves cross-border financing the processor is configured to override or rescind all recall orders issued after the receipt of the resolution.

6. The system of claim 1, wherein the processor is further configured to update a securities financing report Journal or securities financing report Ledger residing on a server accessible to the unique lender.

7. The system of claim 1, wherein the processor is configured to:
  determine all counterparty identifiers associated with all transactions associated with the borrower identifier;
  monitor all transactions associated with the borrower identifier;
  determine if there is a default under any transaction associated with the borrower identifier; and
  upon the determination that a default has occurred in any transaction associated with the borrower identifier alert all the counterparty identifiers of the default.

8. The system of claim 7, wherein upon the determination that a default has occurred in any transaction associated with the borrower identifier the processor is further configured to flag the default in a securities financing report Journal or securities financing report Ledger residing on a server accessible to the unique lender.

9. The system of claim 1, wherein the processor is configured to:
  determine all counterparty identifiers associated with all transactions associated with the borrower identifier;
  monitor third party news reports referencing the unique borrower associated with the borrower identifier and determine if the unique borrower has filed for bankruptcy or legal action has been commenced against the unique borrower for non-payment of debts; and
  upon the determination that the unique borrower has declared bankruptcy or legal action has been commenced against the unique borrower for non-payment of debts alert all the counterparty identifiers of the default.

10. The system of claim 9, wherein upon the determination that the unique borrower has declared bankruptcy or legal action has been commenced against the unique borrower for non-payment of debts the processor is further configured to flag the default in a securities financing report Journal or securities financing report Ledger residing on a server accessible to the unique lender.

11. A blockchain-based system for enforcing a smart contract on a network comprising one or more cryptographically-signed blocks, the system comprising:
  a software application, the application operating on a mobile computer device or on a computer device, which is in communication with multiple securities lenders and securities borrowers, the application is configured to receive:
    a securities financing report including:
      a lender identifier associated with a unique lender,
      a borrower identifier associated with a unique borrower,
      an security identification number associated with a unique security, traded on an exchange, being lent by the unique lender to the unique borrower, and
      a collateral identifier associated with an amount of cash or collateral securities provided by the unique borrower to the unique lender,
      wherein the borrower identifier, the lender identifier, the security identification number and the collateral identifier define a unique transaction,
    a minimum collateral value threshold previously uploaded by an employee or agent of the unique lender; and
    a list of blockchains previously associated with previously identified security identification numbers; and
  a processor in communication through the wired and/or wireless communication network with the software application, the processer is configured to:
    compare the security identification number received by the software application with the security identification number on prior blockchains to identify a matching blockchain, and
    generate and transmit to the matching blockchain an update hash containing an updated timestamp, an updated lender identifier, and updated borrower identifier and an updated collateral identifier;
  wherein, the processor is further configured to monitor the value of the collateral identified by the last collateral identifier on the matching blockchain and when the value falls below the minimum collateral value threshold, within a range of tolerance, the processor is configured to issue an order recalling the securities associated with the security identification number to all borrower identifiers identified on the matching blockchain and instructing the exchange to prohibit any transfers of the securities to parties other than the first lender identifier identified on the matching blockchain.

12. The system of claim 11 wherein the process is further configured to create and assign a unique private transaction key for each transaction, determine the identify of all identifiers associated with prior transactions on the blockchain, and transmit the unique private transaction key to each identifier identified.

13. The system of claim 12, wherein the private transaction key uses at least 256-bit encryption or higher.

14. The systems of claim 11, wherein the software application is configured to accept cross border resolutions from a credentialed foreign regulator and the processor is configured to determine whether the transaction involves cross-border financing and upon confirmation that the transaction involves cross-border financing the processor is configured to override or rescind all recall orders issued after the receipt of the resolution.

15. The system of claim 11, wherein the processor is further configured to update a securities financing report Journal or securities financing report Ledger residing on a server accessible to the unique lender.

16. The system of claim 11, wherein the processor is configured to:
  determine all counterparty identifiers associated with all transactions associated with the borrower identifier;
  monitor all transactions associated with the borrower identifier;
  determine if there is a default under any transaction associated with the borrower identifier; and
  upon the determination that a default has occurred in any transaction associated with the borrower identifier alert all the counterparty identifiers of the default.

17. The system of claim 16, wherein upon the determination that a default has occurred in any transaction associated with the borrower identifier the processor is further configured to flag the default in a securities financing report Journal or securities financing report Ledger residing on a server accessible to the unique lender.

18. The system of claim 11, wherein the processor is configured to:
  determine all counterparty identifiers associated with all transactions associated with the borrower identifier;
  monitor third party news reports referencing the unique borrower associated with the borrower identifier and determine if the unique borrower has filed for bankruptcy or legal action has been commenced against the unique borrower for non-payment of debts; and
  upon the determination that the unique borrower has declared bankruptcy or legal action has been commenced against the unique borrower for non-payment of debts alert all the counterparty identifiers of the default.

19. The system of claim 18, wherein upon the determination that the unique borrower has declared bankruptcy or legal action has been commenced against the unique borrower for non-payment of debts the processor is further configured to flag the default in a securities financing report Journal or securities financing report Ledger residing on a server accessible to the unique lender.

20. A method for enforcing a smart contract on a blockchain-based network comprising one or more cryptographically-signed blocks, the method comprising:
  receiving a cryptographically secure securities financing report including:
    a lender identifier associated with a unique lender,
      a borrower identifier associated with a unique borrower,
      a security identification number associated with a unique security, traded on an exchange, being lent by the unique lender to the unique borrower, and
      a collateral identifier associated with an amount of cash or collateral securities provided by the unique borrower to the unique lender,
    wherein the lender identifier, the borrower identifier, the security identification number and the collateral identifier define a unique transaction,
    a minimum collateral value threshold; and
    a list of blockchains previously associated with previously identified security identification numbers
  upon receiving securities financing report parsing the cryptographically secure securities financing report, comprising at least
  comparing the security identification number received with security identification numbers on previously created blockchains to identify a matching blockchain,
  if there is a matching blockchain generating and transmitting to the matching blockchain an update hash containing an updated timestamp, an updated lender identifier, updated borrower identifier, and an updated collateral identifier, and
  if there is not a matching blockchain, generating a genesis block for a new blockchain, the genesis block containing a first timestamp, the unique transaction, and a unique proof associated with the unique transaction.

\* \* \* \* \*